No. 810,375. PATENTED JAN. 16, 1906.
McCLELLAND MYERS.
GLASS MANUFACTURING APPARATUS.
APPLICATION FILED FEB. 17, 1904.
2 SHEETS—SHEET 2.
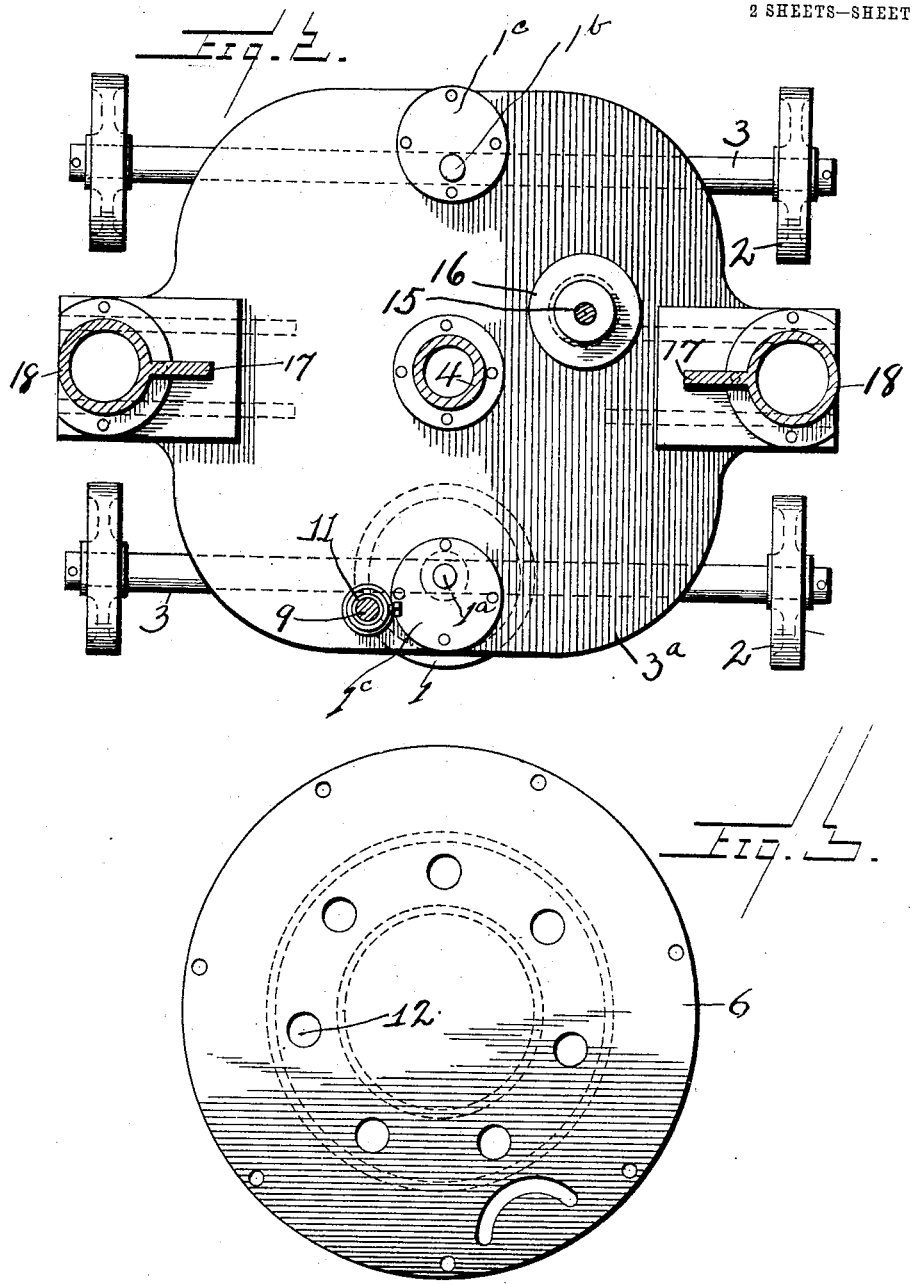
WITNESSES:
INVENTOR
McClelland Myers,
BY
Attorney

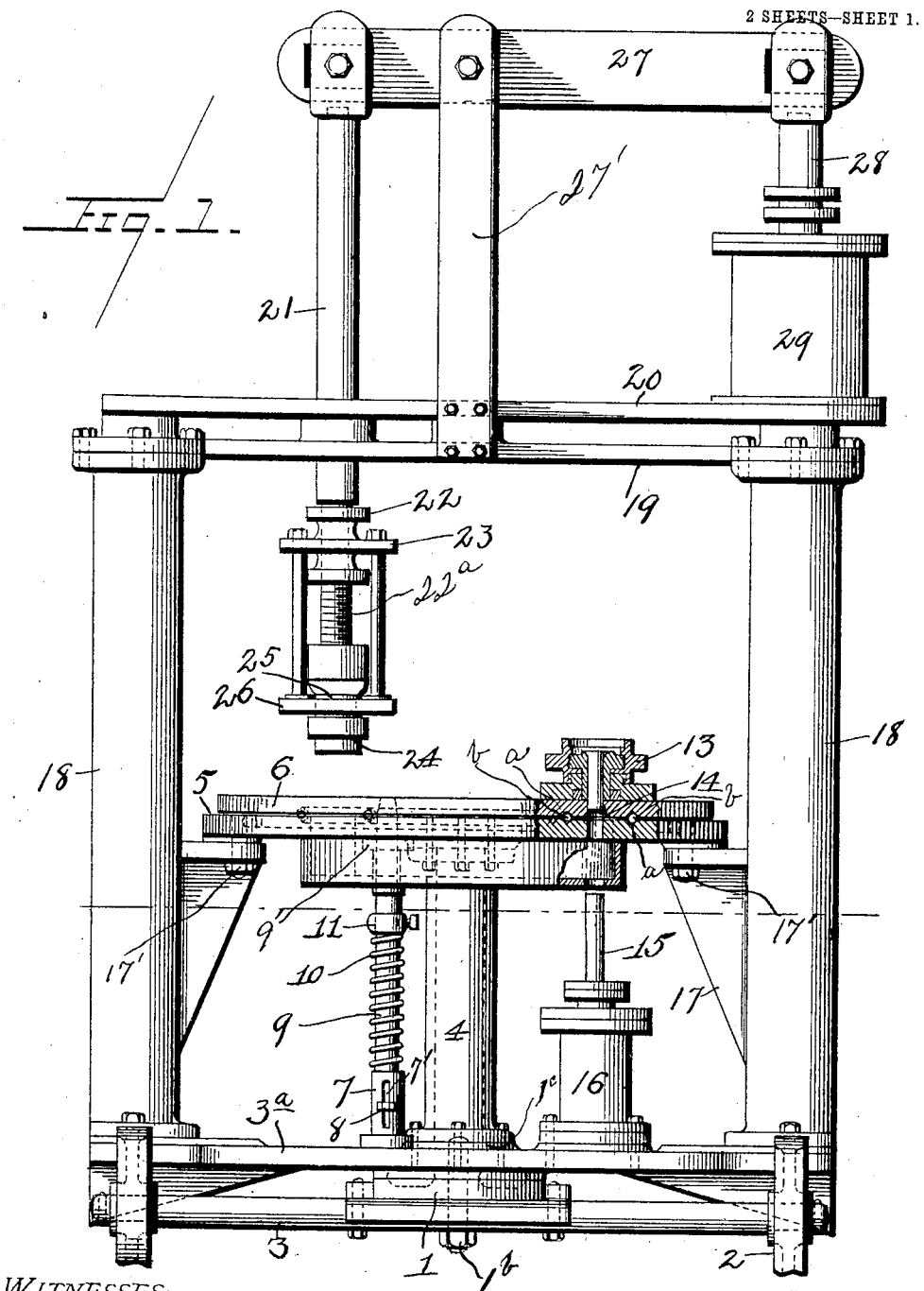

UNITED STATES PATENT OFFICE.

McCLELLAND MYERS, OF MOOSIC, PENNSYLVANIA, ASSIGNOR OF ONE-HALF TO JOHN P. ELKINS, OF INDIANA, PENNSYLVANIA.

GLASS-MANUFACTURING APPARATUS.

No. 810,375.     Specification of Letters Patent.     Patented Jan. 16, 1906.

Application filed February 17, 1904. Serial No. 193,976.

*To all whom it may concern:*

Be it known that I, McCLELLAND MYERS, a citizen of the United States, residing at Moosic, in the county of Lackawanna and State of Pennsylvania, have invented certain new and useful Improvements in Glass-Manufacturing Apparatus, of which the following is a specification.

This invention relates to glass-molding machinery, and particularly to a machine for successively bringing a series of molds into operative position with relation to a plunger and in novel means for arresting the table carrying the molds when said molds have been brought into operative relation to the said plunger.

Furthermore, an object of the invention is to provide novel means for effecting the rotary movement of the mold-core, whereby the said core is turned to remove the core from the hollow being cast in the mold. I have described in two companion applications a mold of the character designed for use in connection with this means, and in a second application I have disclosed a mechanical movement for rotating the core for ejecting the article from the mold. It is to be understood that the mold shown in this drawing is to be the same in details of construction as the mold described in the said companion application and that the mechanical means for providing the rotary core would be utilized in this machine to forego a similar result. Therefore the mold will not be described in detail nor will the mechanical movement be described in detail; but reference will be had to the said companion applications for the understanding of these features.

A further object of the invention is to provide a novel means for adjusting the presser-head in order that its truck may be varied to suit particular requirements.

Finally, an object of the invention is to produce a glass-mold of the character noted which will prove efficient and satisfactory in use and prove inexpensive to manufacture.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts throughout the several views, and in which—

Figure 1 is a view in elevation of a glass-molding machine embodying the invention. Fig. 2 is a sectional view on the line 2 2 of Fig. 1, and Fig. 3 is a plan view of the table.

In the drawings, 2 denotes supporting-wheels mounted on axles 3, which axles are suitably secured to a body or bed-plate $3^a$ in any well-known manner. In the drawings it is illustrated by one of the axles 3, being provided with a fifth-wheel 1, through which passes a king-bolt $1^a$. The remaining axle is secured to the bed-plate $3^a$ in any preferred manner by the bolt $1^b$. Plates $1^c$ are carried by the upper surface of the bed-plate as a support for the pins or bolts $1^a$ $1^b$. This construction is no part of the invention and may be changed to suit the various uses of practice, the essential feature being a suitably-supported bed-plate. Centrally of the bed-plate $3^a$ is a standard 4, on which rests a platform 5. On the platform 5 is rotatably mounted a table 6, and in the opposing faces of the platform and table is a series of annular grooves $a$, forming raceways for the antifriction-balls $b$. Secured to the bed-plate $3^a$ is a sleeve 7, provided with a longitudinal slot $7'$.

Working within the sleeve is a portion of a plunger 9, which passes up through a suitable aperture in the platform 5 and engages one of the apertures 12 with which the table 6 is provided. The portion of the plunger within the sleeve 7 carries a treadle 8, which passes through the slot $7'$ of the sleeve and is adapted to be engaged by the foot of an operator to withdraw the plunger 9 from an aperture 12. The plunger 9 is normally to be projected within one of the apertures 12, and to hold said plunger in its normal position a spring 10 is encircled about the plunger 9, one end of said spring bearing against the top of the sleeve 7 and the opposite end against a collar 11, which is adjustable on the plunger 9 in order that the tension of the spring may be varied. Thus it is to be seen that the plunger 9 acts as a lock for holding the table 6 against rotation for the purpose to be hereinafter disclosed. In order to limit the upward movement of the plunger 9, a sleeve or collar $9'$ is carried thereby, adapted to abut the platform, as shown in dotted lines, Fig. 1.

Arranged above each of the apertures 12 is a mold 13, and each of the molds carries an ejector-plunger 14, which is so positioned as to be directly over or slightly within an aperture 12.

Secured to the bed-plate 3$^a$ and beneath the platform 5 is a cylinder 16, provided with a piston-rod 15, and the rod 15 is adapted to pass through an aperture 15$^a$ in the platform 5 and contact with and raise the ejector-plunger 14 for the purpose readily understood. The cylinder 16 is supplied with air, steam, or other fluid in any well-known or preferred manner for operating the piston-rod 15. It is to be noted that the aperture 15$^a$ coincides with the apertures 12 of the table 6. Carried by the bed-plate 3$^a$ are the opposed uprights or posts 18, which extend a suitable distance above the table 6. The tops of the posts 18 are connected by cross-beams 19 and 20, and intermediate the length of each post is a web or bracket 17, on which rests an edge of the platform 5, said platform being secured thereto by bolts 17'. By this means the strain of the platform is distributed to the post. Extending upwardly from the cross-beams 19 and 20 and secured thereto is a standard 27', which has pivoted to its free end a lever 27. One end of the lever 27 has pivoted thereto an end of a rod 21, which passes through the cross-beams 19 and 20.

The lower end of the rod 21 carries a yoke 26, which is adapted to be adjusted thereon, said adjustment being attained by the nut 22, swiveled in the top plate 23 of the yoke and engaging a threaded portion 22$^a$ of the rod 21.

Attached to the yoke 26 is a presser-head 24, adapted to engage each of the molds 13 as they are successively brought thereunder. The mold and head are similar in construction to a device described in a companion application, and specific details thereof are thought to be unnecessary, except to the fact that the action of the plunger on the material within the mold is from the top and on the exterior at all times. In other words, the compression of the material is confined within the presser-head and not between the presser-head and walls of the mold, as is the general art. To accomplish this result, the outer surface of the presser-head must fit snugly within the mold, an arrangement which is fully illustrated in the drawings.

The opposite end of the lever 27 is secured to a rod 28, working in a cylinder 29, which cylinder receives its fluid in any well-known or preferred manner. It is to be noticed that the cylinder 29 is arranged directly over one of the posts 18. By this means much pressure is relieved from the cross-beams 19 and 20 and any undue strain is obviated, as the strain of the cylinder in operating the rod is given directly and solely to the post.

The table 6 is similar to that disclosed in a companion application, and as the parts thereof not mentioned herein are fully described therein additional description is thought unnecessary.

In operation suitable material is placed within the molds 13, and the table 6 is held against rotation by the plunger 9. By means of the cylinder 28 and its associate parts the rod 21 forces the head 24 into engagement with the mold, and upon its withdrawal therefrom the plunger 9 is depressed in order to allow the table to be rotated by hand or otherwise until a second mold is in position, and so on. When the mold has at length reached the aperture 15$^a$ of the platform, the rod 15 is operated to contact with the ejector-plunger 14 for the purposes understood.

Having fully described the invention, what I claim as new, and desire to secure by Letters Patent, is—

1. In a glass-molding machine, a base, a stationary table having an aperture supported above the base, a table rotatably mounted on the stationary table, a sleeve on the base, said sleeve being provided with a slot, a latch having one end passing through the aperture of the stationary table, and normally engaging the rotatable table to hold the same against movement, the opposite end of the latch fitting within the sleeve, a collar on the latch, and a spring embracing the latch and contacting with the collar and sleeve to hold the latch in its normal position, and a treadle secured to the latch and extending through the slot of the sleeve.

2. In a glass-molding machine, a suitable truck, a table mounted and rotatable thereon, molds carried by the table, a presser-head, a rod for the presser-head, a nut threaded on the rod of the presser-head, a yoke connecting the presser-head to the nut on the rod thereof.

3. In a glass-molding machine, a suitable truck, a table mounted and rotatable thereon, molds carried by the table, means for arresting the table holding it at predetermined intervals, a presser-head operated thereabove in conjunction with the molds, a rod for the presser-head having a threaded lower end, a nut run on the threads thereof, a yoke connected to the nut, and to the presser-head.

4. In a glass-molding machine, a suitable truck, a table mounted and rotatable thereon, molds carried by the table, means for arresting the table holding it at predetermined intervals, a presser-head operated thereabove in conjunction with the molds, a rod for the presser-head having threaded lower ends, a nut run on the threads thereof, a yoke connected to the nut and to the presser-head, a lever suitably pivoted and connected to the upper end of the rod of the presser-head and means for oscillating the lever.

5. In a glass-molding machine, a suitable truck, a table mounted and rotatable thereon, the said table having a series of apertures and spring-pressed detent adapted to enter the apertures and arrest the table, molds carried by the table, a presser-head operating from above in conjunction with the mold, the said table being held by the detent with the molds successively under the said presser-head, an ejector carried by each mold and a piston-rod operated to lift the ejectors as they are successively brought into alinement with the said piston-rod.

6. In a glass-molding machine, a suitable truck, a table mounted and rotatable thereon, the said table having a series of apertures and spring-pressed detent adapted to enter the apertures and arrest the table, molds carried by the table, a presser-head operating from above in conjunction with the mold, the said table being held by the detent with the molds successively under the said presser-head, an ejector carried by each mold and a piston-rod operated to lift the ejectors as they are successively brought into alinement with the said piston-rod, a suitable rod for carrying the presser-head, a lever for operating the presser-head, a piston-rod for reciprocating the lever and a suitable cylinder and piston in conjunction with which the piston-rod operates.

7. In a glass-molding machine, a rotatably-mounted table, molds carried by the table, ejectors carried by the molds, and a piston-rod for operating the ejectors and means for holding the molds in alinement with the piston-rod.

8. In a glass-molding machine, a stationary table provided with an aperture, a table rotatably mounted thereon, molds carried by the rotatable table, ejectors for the molds adjusted to aline with the aperture of the stationary table, and a piston-rod passing through the aperture to engage the ejector for operating the same.

In testimony whereof I affix my signature in presence of two witnesses.

McCLELLAND MYERS.

Witnesses:
   D. B. REPLOGLE,
   G. E. SHAY.